United States Patent [19]
Li

[11] Patent Number: 5,612,996
[45] Date of Patent: Mar. 18, 1997

[54] LOOP GAIN PROCESSING SYSTEM FOR SPEAKERPHONE APPLICATIONS

[75] Inventor: Xu Li, Cerritos, Calif.

[73] Assignee: Rockwell International Corporation, Seal Beach, Calif.

[21] Appl. No.: 531,992

[22] Filed: Sep. 21, 1995

[51] Int. Cl.$^6$ ............... H04M 9/08; H04B 3/20
[52] U.S. Cl. ............ 379/390; 379/388; 379/389; 379/406; 379/409
[58] Field of Search ............... 379/388, 389, 379/390, 406, 409, 410, 392

[56] References Cited

U.S. PATENT DOCUMENTS

| | | | |
|---|---|---|---|
| 4,600,815 | 7/1986 | Horna | 379/390 |
| 4,629,829 | 12/1986 | Puhl et al. | 379/390 X |
| 4,845,746 | 7/1989 | Li | 379/411 |
| 4,912,758 | 3/1990 | Arbel | 379/411 X |
| 4,979,163 | 12/1990 | Erving et al. | 379/388 X |
| 4,984,265 | 1/1991 | Connan et al. | 379/390 |
| 4,989,242 | 1/1991 | Arnaud | 379/390 |
| 5,016,271 | 5/1991 | Ford | 379/410 |
| 5,099,472 | 3/1992 | Townsend et al. | 379/390 X |
| 5,343,521 | 8/1994 | Jullien et al. | 379/410 |
| 5,353,348 | 10/1994 | Sendyk et al. | 379/410 |
| 5,365,583 | 11/1994 | Huang et al. | 379/390 |
| 5,384,843 | 1/1995 | Masuda et al. | 379/390 X |
| 5,446,787 | 8/1995 | Lofmark | 379/410 |

*Primary Examiner*—Ahmad F. Matar
*Assistant Examiner*—Devendra T. Kumar
*Attorney, Agent, or Firm*—George A. Montanye; David J. Arthur; Susie H. Oh

[57] ABSTRACT

A loop gain processing scheme for a speakerphone arrangement determines system loop gain according to two echo feedback paths within the speakerphone system. Gain values for each half-loop are calculated separately to ensure that both the local and far end telephone or speakerphone system are stable. A first half-loop includes gain contributions from a feedback path extending from a local speakerphone microphone to a hybrid line interface, which couples the speakerphone to the telephone network line, and subsequently to a local loudspeaker. A second half-loop defines a feedback path from a line receive channel to a transmit channel. Gain contributions are input into a system controller which determines gain values for each of the half-loops to accurately set the proper gain switching mode.

24 Claims, 3 Drawing Sheets

LOOP GAIN PROCESSING SYSTEM FOR SPEAKERPHONE APPLICATIONS

BACKGROUND OF THE INVENTION

1. Field of the Invention

The present invention relates to speakerphone technologies and, more particularly, to a speakerphone system provided with a scheme for minimizing the effects of echoes and gains introduced by the speakerphone components.

2. Description of Related Art

Speakerphones are widely used today. The ability to use a telephone set without occupying the user's hands, and also enable multiple parties to participate in the telephone call without requiring conference-type calling has been found to be a significant advantage over conventional hand-held telephone systems.

A speakerphone defines a speaker telephone which includes a microphone and a loudspeaker to enable telephone communications without a conventional telephone handset. Typically, the microphone and loudspeaker in the speakerphone are contained in the same physical structure and are thus in close proximity to each other. In many instances, however, such as in desk-top PC applications, the speakerphone electronics cannot assume that the placement of the microphone and the loudspeaker, and thus the acoustic echo path, is fixed. Thus, if the microphone is physically separable from and independently moveable relative to the loudspeaker assembly, the user may want to move the microphone relative to the loudspeaker during the conversation.

As a consequence of such close and variable proximity, speakerphones are plagued with certain problems that are inherent in the simultaneous use of the microphone and loudspeaker which comprise the speakerphone. Significant problems with speakerphone clarity and stability, e.g., disruption of the conversation due to howling, in full-duplex speakerphones are associated with acoustic coupling between the microphone and the loudspeaker. In a full-duplex system, simultaneous two-way communication is enabled where the local user can speak and listen to received speech simultaneously with the remote user. Such simultaneous conversation, however, creates acoustic feedback problems which occur when the speech received by the loudspeaker at the local end is picked up by the local microphone and directed back to the remote end. As a result, the remote party may hear a strong echo of his or her own voice. If this acoustic cycling continues, the voice quality and conversation will be distorted and significantly degraded, causing the system to become unstable, i.e., howling will occur. Of course, if the remote end user is also using a speakerphone in a back-to-back arrangement, the acoustic feedback problems are magnified.

Thus, some of the problems associated with acoustic and electrical feedback are echo, as mentioned above, howling, and gain switching, among others. For example, with regard to problems with echo, although conventional echo cancellers are generally used to reduce echo in the speakerphone performance, echo cancellation alone is not always adequate in limiting the total loop gain to less than unity to limit the positive feedback loop and, therefore, maintain system stability.

The loop gain refers to the total resultant gain of the voice signal as it passes through the various components of the speakerphone. The gain loop typically includes any speakerphone components from the microphone to the transmit channel to the remote telephone system, back through the receive channel to the loudspeaker and acoustically coupled to the microphone. Some of the major internal components of the speakerphone includes echo cancellers, such as an acoustic echo canceller (AEC) and a line echo canceller (LEC), and a voice control processor.

One type of echo canceller, e.g., an acoustic echo canceller (AEC), typically comprises a plurality of adaptive filters associated with the microphone and loudspeaker which estimate the impulse response between the microphone and loudspeaker. Another echo canceller, e.g., line echo canceller (LEC), may be implemented across the transmit and receive channels to cancel the electric reflection of signals generated by an impedance mismatch in the telephone network interface circuitry.

For each impulse response of the echo paths, an estimate of the echo is determined and subtracted from the incoming speech signal. The adaptive filters are generally included in a digital signal processing (DSP) device or other programmable processor, and are defined by a variety of algorithms that affect and determine their real-time performance, i.e., the speed necessary to converge to the echo path impulse response and accuracy of the estimation process. The algorithm coefficients are continuously adapted to represent the impulse response between the loudspeaker and microphone or the impulse response between the transmit channel and the receive channel of the network interface.

If the echo canceller impulse response accurately matches that of the echo path, the echo will be canceled. However, due to conventional device limitations, e.g., for a finite-bit resolution device, inaccuracy in coefficients exists, such that 100% cancellation can rarely, if ever, be achieved. In addition, any changes in echo path will cause the current estimated impulse response to deviate from its real one. Before the echo canceller can recognize and compensate for the change, and thus reconverge itself, a larger residue echo will be present in the system.

Moreover, in full-duplex speakerphones, AEC and LEC are typically situated adjacent each other to cancel acoustic and electrical echoes. Consequently, the AEC and the LEC must be precisely controlled so that their coefficients are adapted only in receive and transmit modes, respectively. The coefficient adaptation process is limited to receive and transmit modes because (1) the room impulse response is modeled only with the receive signal, and the local talker signal can disturb the process, (2) the network interface impulse response is modeled only with the transmit signal, and the remote talker signal can disturb the process. Therefore, it is crucial to maintain awareness of the continuous changes in the voice signal and the system parameters.

As speakerphone use becomes more commonplace, back-to-back speakerphone system performance is of greater concern. Thus, the voice control processor must consider such arrangements to maintain complete, end-to-end speakerphone performance. Some speakerphones, however, are only directed to local speakerphones which communicate with remote handsets, rather than remote speakerphones. Accordingly, the voice control processor must be able to handle such situations.

The voice control processor is the central control of the complete speakerphone system. It should include speech detectors and loop gain control. The speech detectors determine the communication mode which, in turn, controls the adaptation process of the echo cancellers, as mentioned above. Current speech detectors, however, are not sufficiently sensitive to low level voice signals or are inadequate in speedy detection of double talk or falsely detect noise as speech. An example of such a speech detector uses a simple comparator to compare the transmit and receive signal levels and assert a detection signal if the receive level is greater than the transmit level. It is known that depending on the strength of acoustic coupling and the telephone line loss characteristics, the transmit level can be many times greater than the receive level during much of the conversation. In such cases, speech detection would thus be too slow or too late to detect the receive signal for correct channel gain adjustment. Moreover, this late decision would cause the echo canceller to drift away from its converged impulse response and lose some of the cancellation performance when it is desperately needed. This kind of speech detectors also false detect the echo path change and thus delay the echo canceller's convergence process.

As mentioned earlier, echo cancellers also cannot always maintain the optimum cancellation performance. Consequently, some gain switching must be applied to the system to maintain system stability. Furthermore, in speakerphone systems which utilize automatic gain control, the total loop gain can change abruptly due to sharp changes in the input signal. The loop gain scheme must be capable of adequately compensating for the sudden changes in the signal as well as the echo strength. Conventional speakerphone systems, however, greatly simplify the loop gain scheme to result in unnatural voice conversation, degradation of voice level, or temporal system instability.

In a full-duplex speakerphone system, typically four different conversation modes can exist. These modes may include (1) silence mode (no conversation at local or remote ends); (2) transmit mode (local user is active, remote user is silent); (3) receive mode (local user silent, remote user active); and (4) double-talk mode (simultaneous two-way local and remote communication). Due to the above-described problems of echo and howling, when switching from one communication mode to another, smooth gain switching must be applied to ensure good voice quality, as well as system stability. Without understanding the relationship between the communication mode switching and the corresponding gain switching requirement, speech clicking, syllable chopping, or transient echo may be heard as in many conventional speakerphones.

For example, referring to the conventional single loop diagram of FIG. 1, the closed-loop 100 gain is typically calculated for all the speakerphone components at the local end. The total gain for the loop including the AEC 144, the transmit AGC 120, the transmit channel gain adjustment 122, the LEC 134, the receive AGC 136, and the receive channel gain adjustment 138, is combined together for the complete local loop according to the equation:

$$LoopGain = AEC_{gain} * TXAGC_{gain} * TXCHAN_{gain} * LEC_{gain} * RXAGC_{gain} * RXCHAN_{gain}$$

In such conventional schemes, however, the total gain of the gain loop 100 will often add up to a value greater than unity. Since it does not provide gain information specific to each voice channel, blind attenuations are usually applied, resulting the controller 148 to over-attenuate the signals in the system to keep system stable. This over-attenuation in turn can later cause an unpleasant gain switching process, resulting in loudspeaker clicking sounds, gating effects in the background noise level, and chopped speech syllables. Moreover, in a back-to-back speakerphone arrangement with high level noise present in the system environment, this loop gain scheme may cause "ringing," the severity of which depends on the safety margin designed in the gain switching process. The greater the safety margin, the more the gain switching effects will be heard.

As described above, accuracy, speed, and smoothness of gain switching are also necessary to system performance. Depending upon the desired transmit and receive signal levels, the gain can be adjusted to increase the signal level by applying a multiplier greater than one to the signal. Likewise, the signal can be decreased, or attenuated, by multiplying the signal with a gain value of less than one. The speakerphone device determines the optimum gain to apply to both the transmit channel and the receive channel via a variety of gain calculation algorithms.

In summary, sensitive and accurate speech detection, well-designed echo cancellers, sophisticated loop gain processing, and smooth gain switching process are the key factors of making a fully-working full-duplex speakerphone.

SUMMARY OF THE INVENTION

Accordingly, an object of the present invention is to provide a loop gain processing scheme for a speakerphone arrangement. Two echo feedback paths in the speakerphone system are identified. Gain values for each half-loop are calculated separately to ensure that both the local and far end speakerphones are stable with minimum necessary attenuation applied to the system. The first half-loop defines the feedback path from the local speakerphone microphone to a hybrid network interface and back to the local loudspeaker. The second half-loop includes the acoustic feedback path from a line receive node through the speakerphone acoustic interface to a line transmit node.

In accordance with these and other objects, a speakerphone system in accordance with the present invention includes a local microphone and loudspeaker arrangement coupled via an echo cancellation network including an acoustic echo canceller (AEC) and a line echo canceller (LEC). In addition, automatic gain control (AGC) devices are implemented to provide automated signal level adjustment to voice signals carried by a transmit channel and a receive channel. All the gain contributions, including those from AEC, transmit AGC, transmit gain adjustment, LEC, receive AGC, receive gain adjustment, and volume (scaling) controls in the system, along with the communication mode information determined by plural speech detectors, are processed in a controller which determines the overall gain values from each of the half-loops in order to accurately set the gain switching on both transmit and receive channels.

The present invention also addresses the application of the half-loop gains in each conversation mode, i.e., (1) silence mode (no conversation at local or remote ends); (2) transmit mode (local user is active, remote user is silent); (3) receive mode (local user silent, remote user active); and (4) double-talk mode (simultaneous two-way local and remote communication), to set appropriate target gain switching values for each channel.

Other objects and aspects of the invention will become apparent to those skilled in the art from the detailed description of the invention which is presented by way of example and not as a limitation of the present invention.

DETAILED DESCRIPTION OF THE PREFERRED EMBODIMENTS

The following is a description of the best presently contemplated mode of carrying out the invention. In the accompanying drawings, like numerals designate like parts of the several figures. This description is made for the purpose of illustrating the general principles of embodiments of the invention and should not be taken in a limiting sense. The scope of the invention is determined by reference to the accompanying claims.

Embodiments of the present invention provide for improved speakerphone system performance and also minimizes performance degradation attributable to single or back-to-back use of local and remote speakerphones. By investigating two local echo feedback paths, called half-loops, rather than a single full-loop path, the transmit and receive signal level adjustments can be optimized based upon the performance of any echo cancellers, e.g., AEC or LEC, in the local speakerphone components. As a result, system gain assignment or switching for particular conversation modes can be performed more precisely and gracefully to enhance audio quality and stability of local side speakerphone arrangements, as well as back-to-back local and remote speakerphone arrangements.

The first half-loop allows a system controller to determine if the LEC is performing inadequately, or falling to completely cancel or attenuate electrical line echo. If such a determination is made, a receive signal on the receive channel is passed through an attenuator before the signal is received and broadcast by the local loudspeaker. The second half-loop extending from the network receive channel to the local loudspeaker and microphone and back to the network transmit channel addresses the problems with the AEC. If the controller determines that the AEC is performing inadequately to keep this half-loop gain under unity, another attenuator is implemented to add an attenuation to the transmit channel signal. The two half-loop gain calculations also form the baseline for carrying out gain switching in different conversation modes.

Figure 1:
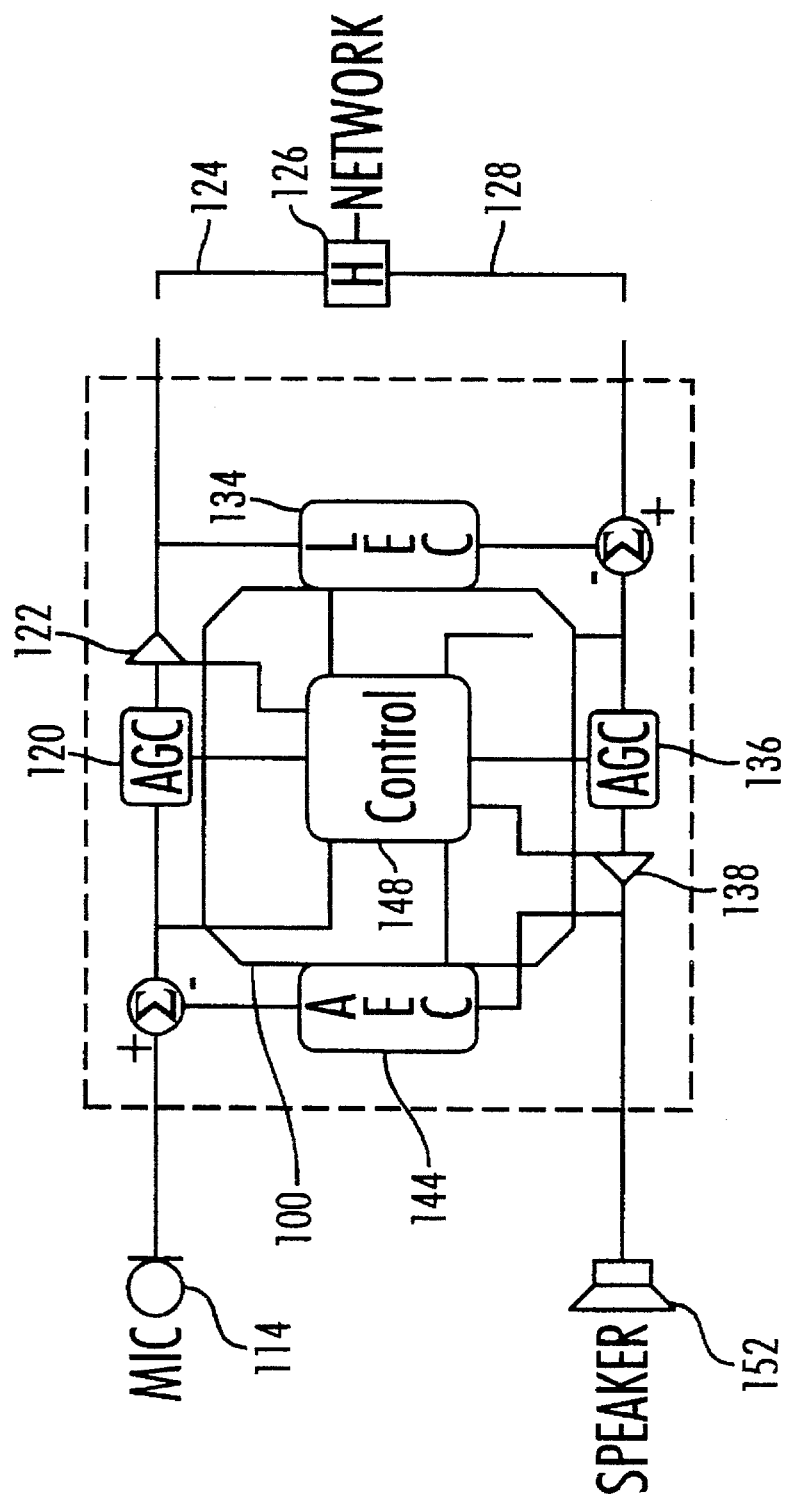
FIG. 1 is a block diagram of a conventional speakerphone loop structure.
Figures 2A, 2B:
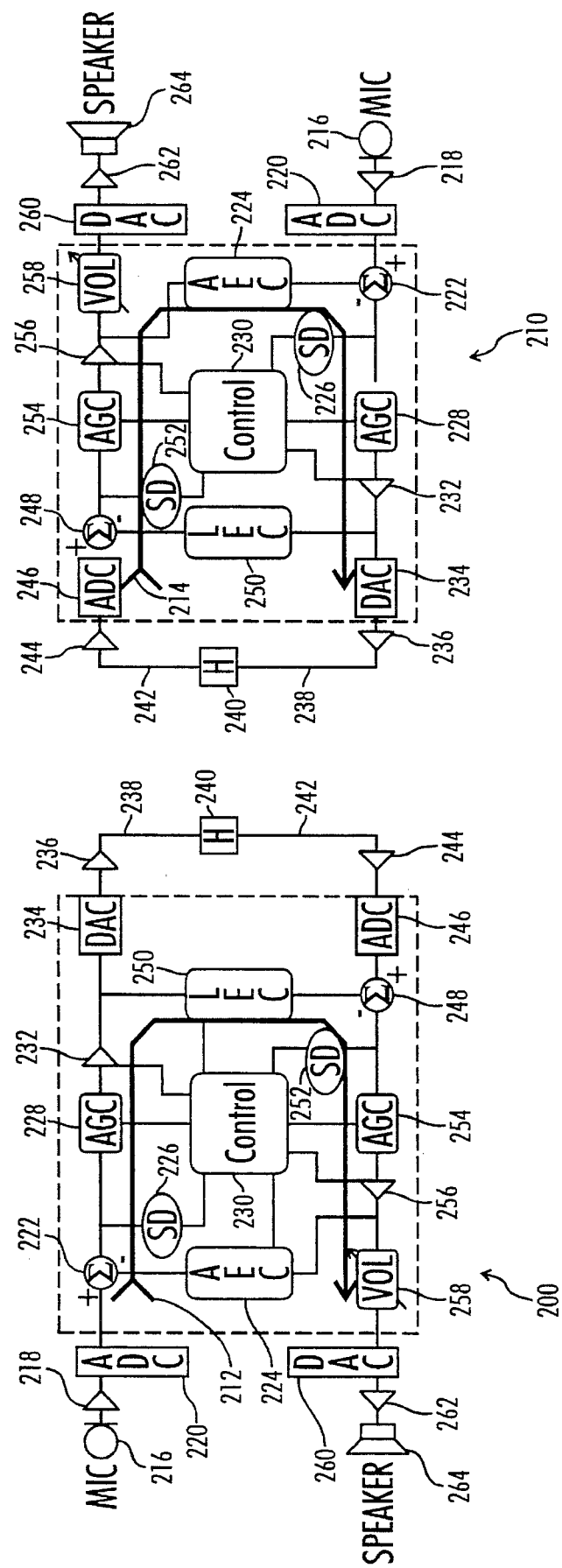
FIGS. 2a and 2b show two half-loops of a speakerphone device according to preferred embodiments of the present invention.

As illustrated in FIGS. 2a and 2b, two echo feedback paths associated with a local speakerphone system 200 and the inverted, mirror-image configuration of the local speakerphone 210 are indicated as half-loops 212 and 214, respectively. It will be recognized that the gain calculations for the local station 200 may be applied to a remote speakerphone assembly which would show a similar configuration as the inverted orientation of the local station at 210. According to embodiments of the present invention, gain values for each half-loop are calculated separately to ensure that both the local and far end telephone or speakerphone system are stable.

In the preferred embodiment of the invention shown in FIG. 2a, the first half-loop 212 of speakerphone components that contribute to the half-loop gain calculation includes a transmit AGC 228, a transmit gain adjustment 232, a LEC 250, a receive AGC 254, a receive gain adjustment 256, and a local loudspeaker volume control 258. More particularly, the local microphone 216 receives input analog transmit signals to be transmitted to the remote end user. The microphone 216 is coupled to an amplifier 218 before the signal is input into an A/D converter 220 which converts the input analog signal to digital format. The digital microphone signal then subtracts (indicated by the minus sign at 222 in FIG. 2) the output of an AEC 224. The AEC 224 is provided to cancel acoustic feedback attributable to the echo between the incoming receive signal which is output at the local loudspeaker 264 and the local microphone signal which may include some of the local loudspeaker broadcast.

The output of the summation 222 is then input into the transmit AGC 228 as well as a speech detector 226 which evaluates the transmit signal and determines in which speakerphone conversation mode the local and remote users are operating. The transmit AGC 228 receives the summed transmit signal and automatically adjusts the long-term signal average to a desired level. The output of the transmit AGC 228 is then directed into an attenuator 232 where the transmit gain switching set by controller 230 is applied.

In preferred embodiments, the controller 230 provides controls to the adaptation process of each echo canceller, and acts as the primary system decision-maker. As can be seen in both FIGS. 2a and 2b, controller 230 gathers a plurality of data lines and provides appropriate control instructions to other components of the speakerphone system. For example, the controller 230 receives gain information from the transmit and receive AGC devices 228 and 254, and thus can respond to and affect both loop gain determinations.

The controller 230 also receives information pertaining to a volume control 258 included in the receive signal line directed to the local loudspeaker 264. The volume control 258 indicates the digital volume setting of the loudspeaker 264 which only affects loop 212 gain calculation. In addition to the transmit speech detector 226, the controller 230 also receives detection information from the receive speech detector 252 and can thus determine the correct communication mode, i.e., (1) silence mode; (2) transmit mode; (3) receive mode; and (4) double-talk mode.

With the information as to the performance of the echo cancellers, the controller 230 can calculate and determine the type of gain switching to be applied, including such information as how much attenuation, and at what speed, should be applied by attenuators 232 and 256 to correctly switch the communication to the desired conversation mode. Consequently, the controller 230 can direct which adaptive filter coefficients of either the AEC 224 or LEC 250 should be adjusted or fixed as necessary to cancel or attenuate any undesirable acoustic feedback or line echo.

Referring back to the first half-loop 212 of FIG. 2a, after the local transmit signal is multiplied by the desired gain values at attenuator 232, the signal is directed to a D/A converter 234, amplified at 236, if necessary, and transmitted across the transmit line, or channel 238 to the hybrid line interface 240 to be transmitted across the network lines (not shown) to the remote user. Concurrently, the remote analog audio signal which is received at the hybrid interface 240, directed across the receive channel 242, and input into amplifier 244, is converted by A/D converter 246 and subtracted at 248 with the output of the LEC 250.

As noted above, the LEC 250 provides line echo cancellation of echo attributable to electrical echo generated at the hybrid interface due to a mismatch of the network line impedance and the hybrid interface. The summed receive signal is then directed into the receive AGC 254 and speech detector 252. Attenuation for receive gain switching is then applied at 256 to the receive signal, which is then directed through the volume control 258, and ultimately converted back to analog format through D/A converter 260 and amplifier 262, before being output at the loudspeaker 264.

For illustrative purposes, FIG. 2b is shown as an inverted, mirror-image speakerphone structure as that in FIG. 2a, in which the half-loop 214 is directed in the opposite looping direction as half-loop 212. As shown in the figures, the speakerphone components and functions of the components are the same. However, as discussed in more detail below, the half-loops of each figure include different gain contributions within the speakerphone to result in separate loop gain values for each respective channel. This process can avoid unnecessary over-attenuation which can be caused by determining the total gain using a whole-loop structure, as discussed above in the Background of the Invention.

More particularly, embodiments of the present invention are unlike conventional schemes for determining system closed-loop gain. In some conventional speakerphone arrangements, for example, in a conversation transmit mode, a large predetermined attenuation is always applied to the receive channel to limit the maximum signal level at which the local talker can hear him or herself through the local loudspeaker, i.e., to limit the maximum amount of feedback echo from the telephone interface. However, such systems fail to consider that the feedback echo may have already been canceled in the receive channel by the LEC. As a result, this over-attenuation will suppress the normal noise level in the receive channel, which could cause the user to believe the line has been disconnected. It also causes difficulty for the loudspeaker signal level to increase promptly when the speakerphone communication at the local end changes to a receive mode.

Rather, by calculating two half-loop gain values in accordance with embodiments of the present invention, only the minimum necessary attenuation for the voice signal is applied in all speakerphone communication modes. For example, if the half-loop 212 of FIG. 2a results in a gain calculation which indicates that the half-loop gain is sufficiently low such that extra attenuation is not needed on the receive signal in the speakerphone transmit mode, the receive channel 242 can effectively be "left open" (no attenuation at the receive attenuator 256) regardless of the performance of the AEC 224.

Thus, the transmit half-loop 212 of FIG. 2a includes gain contributions from the transmit AGC 228, transmit gain adjustment 232, LEC 250, receive AGC 254, the receive gain adjustment 256, and the speakerphone volume control 258. The total half-loop gain is thus:

$$RXLOOP_{gain} = TXAGC_{gain} * TXCHAN_{gain} * LEC_{gain} * RXAGC_{gain} * RXCHAN_{gain} * VOL_{gain}$$

such that the maximum associated attenuation needed to maintain the half-loop gain below unity is determined according to:

$$RXLoop = \frac{1}{TXAGC_{gain} * TXCHAN_{gain} * LEC_{gain} * RXAGC_{gain} * RXCHAN_{gain} * VOL_{gain}}$$

According to preferred embodiments of the invention, if the half-loop gain $RXLOOP_{gain} \geq 1$, the receive loop gain can be determined to be unity, i.e., $RXLOOP_{gain} = 1$.

Similarly, for the transmit half-loop 214 of FIG. 2b, the transmit half-loop gain is calculated as:

$$TXLOOP_{gain} = RXAGC_{gain} * RXCHAN_{gain} * AEC_{gain} * TXAGC_{gain} * TXCHAN_{gain}$$

with the maximum associated attenuation needed to maintain the half-loop gain below unity being determined according to:

$$TXLoop = \frac{1}{RXAGC_{gain} * RXCHAN_{gain} * AEC_{gain} * TXAGC_{gain} * TXCHAN_{gain}}$$

If the gain for the transmit loop $TXLOOP_{gain} \geq 1$, the transmit loop gain is also set to one, i.e., $TXLOOP_{gain} = 1$.

Here, $AEC_{gain}$ can be found by dividing the output energy of summation 222 by the output energy of receive gain adjustment 256 in speakerphone receive mode. Also, $LEC_{gain}$ can be found by dividing the output energy of summation 248 by the output energy of the transmit gain adjustment 232 in speakerphone transmit mode.

In the double-talk communication mode, when the gain values for the transmit and receive half-loops are combined, the system gain must be quickly decreased to be less than the combined half-loop gain before gain balancing may be implemented to allow simultaneous two-way conversation, since even the echo cancellers cannot completely cancel the echo in the system. Unlike a closed-loop gain scheme, which does not guarantee that the echo return to the local loudspeaker or to the remote end user is less than that received at the microphone A/D converter 220 or on the receive A/D converter 246 of the local user, repectively, the half-loop scheme according to embodiments of the present invention provides substantial stability by maintaining the gain of each half-loop at less than unity while applying minimum gain switching in both transmit and receive channels.

Figure 3:
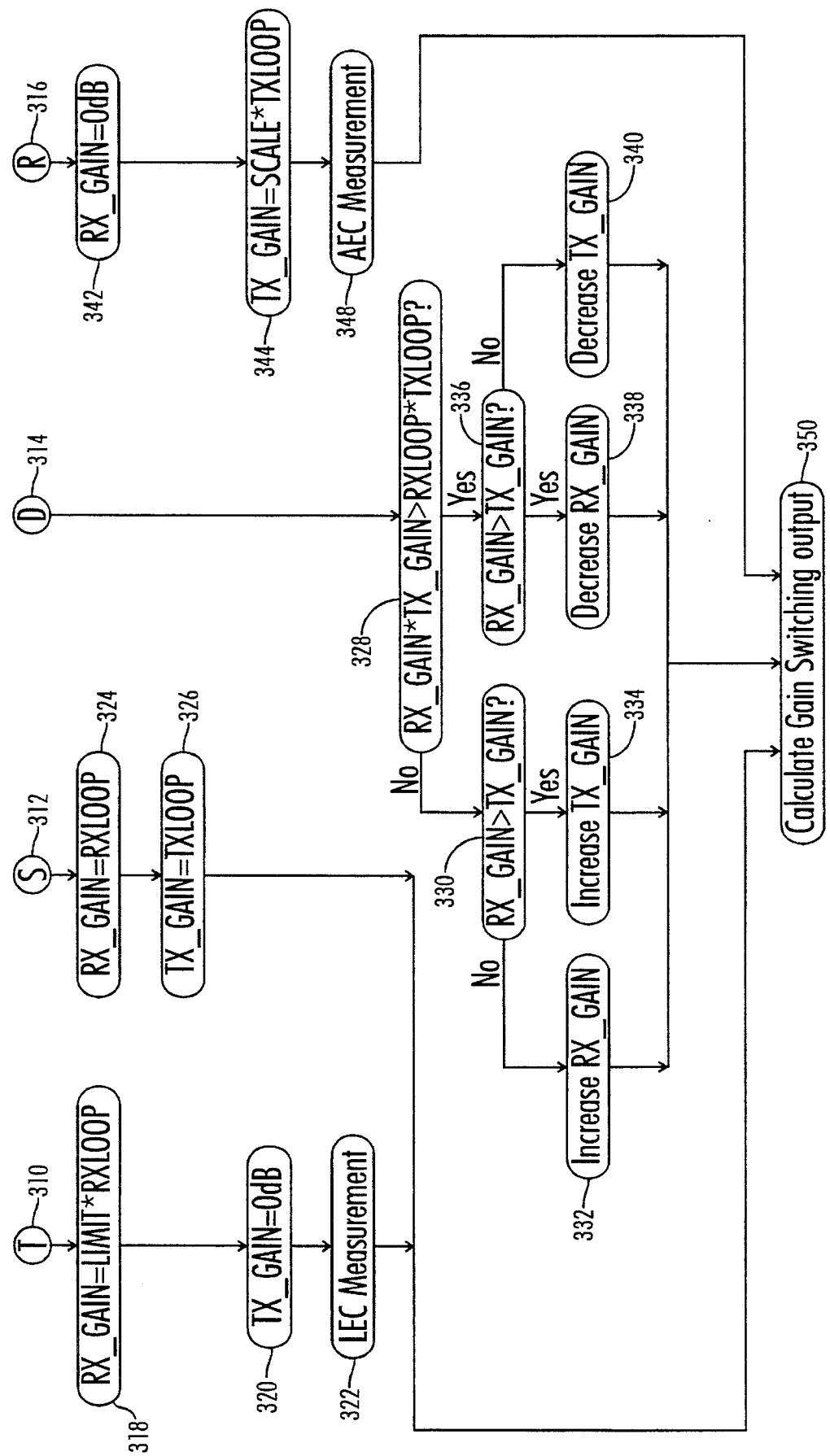
FIG. 3 is a flow chart illustrating the gain switching determination for a variety of speakerphone conversation modes.

Following calculation of the half-loop gains according to the above-described transmit and receive gain loop equations, the half-loop gain values are applied to gain switching. Targeted gain values and appropriate determinations for proper attenuation for each of the four speakerphone communication modes are shown in the flowchart of FIG. 3. It should be recognized that the RXLOOP and TXLOOP terms in FIG. 3 refer to the maximum attentuation necessary for the respective receive and transmit channels. In addition, as explained above in the Background, gain switching in each channel starts from the most recent value, and is adjusted toward the targeted gain values in a quick, yet smooth fashion. The adjusted gain is then applied to the corresponding channel in accordance with the variable speakerphone conversation modes.

For example, if the speakerphone conversation is within the silence mode, and suddenly talk begins at the local end, the system controller 230 (FIGS. 2a and 2b) must ensure that the transmit channel 238 is opened quickly to allow transmission of the voice transmit signal. Accordingly, any signals on the receive channel 242, if not canceled by the LEC, must be attenuated. Preferably, the attenuation scheme is performed according to the flow diagram of FIG. 3.

As indicated in FIG. 3, the four communication modes are T for transmit 310, S for silence 312, D for double-talk 314, and R for receive 316. It will be recognized that the order of the modes is variable at any moment depending upon the flow of communication between the local user and the remote user. Thus, for purposes of this discussion, beginning with the transmit mode 310, the targeted receive gain is set to equal a limitation value multiplied by the receive loop gain at step 318. The limitation factor can be determined by the difference between a user-defined desired receive level at the loudspeaker and the actual receive level after receive gain switching has been applied. The targeted transmit gain is set to 0 dB at step 320. The LEC gain measurement is then enabled at 322 to determine its cancellation capability.

Consequently, the gain switching output is calculated at 350 and represents the mode to which the communication is switching..

In the receive mode 316, the gain calculations mirror those of the transmit mode 310. The targeted, desired receive channel gain is set to 0 dB at 342, while the transmit channel gain is set to equal a scale factor multiplied by the transmit half-loop gain 344. The scale factor can be determined by the difference between a user-defined desired transmit level at the transmit channel 238 (FIG. 2) and the actual receive signal level after the transmit gain switching has been applied. The AEC gain measurement is then incorporated at 348 to determine its cancellation capability. The final gain value is then referenced in the gain switching scheme.

When the speakerphone communication is in the silence mode 312 during which no active voice signals are heard or transmitted between the local and remote telephone systems, it is desirable to maintain normal noise levels on both the receive and transmit channels. At step 324, the target receive channel gain is set to equal the receive half-loop gain. Similarly, the transmit channel gain is targeted to be the transmit half-loop gain at 326. These gain values are then eventually applied to the signals across the transmit and receive channels through gain switching.

In the double-talk mode 314, certain gain determinations must be made before the particular legs of the double-talk scenario are reached. In step 328, it must be determined whether the latest actual receive channel gain multiplied by the transmit channel gain is greater than the receive half-loop gain multiplied by the transmit half-loop gain. If the combined gain value as multiplied for the two channels is less than that for the half-loops, a determination as to whether the receive channel gain is greater than the transmit channel gain must be made at 330. If the answer is yes, the transmit gain is increased at 334. Otherwise, the receive gain is increased at 332 until the gains of both channels are balanced. In other words, to allow the local user, or both parties for that matter, to hear the remote signal at the local loudspeaker, as well as for the remote user to hear the local user over the microphone, preferably gain values for both the receive and transmit channels are increased.

Whereas, if the receive channel gain multiplied by the transmit channel gain is greater than the receive half-loop gain multiplied by the transmit half-loop gain (as determined in step 328), the receive channel gain is compared with the transmit channel gain to determine whether the system controller should decrease the receive and transmit gain values at 338 and 340 to balance the gains between both channels, and thus improve the sound quality at both ends of the conversation. Accordingly, the output gain switching calculation 350 may be made to determine the current actual gain to be applied over the signals in both channels.

Thus, it can be seen that embodiments of the invention provide for substantially increased stability in speakerphone communications by optimizing the transmit and receive signal level adjustments based upon the performance of the local echo cancellers. It will be recognized that embodiments of the present invention may be implemented with single speakerphone communications, as well as back-to-back local and remote speakerphone conversations.

This detailed description is set forth only for purposes of illustrating examples of the present invention and should not be considered to limit the scope thereof in any way. It is recognized that numerous additions, substitutions, and other modifications can be made to the invention without departing from the scope of the invention which is defined in the appended claims and equivalents thereof.

What is claimed is:

1. A method of adjusting and controlling transmit and receive signal amplitudes in a speakerphone system during speakerphone communication between a local user and a remote user, the speakerphone system including a microphone and loudspeaker arrangement, first and second echo cancellers, and transmit and receive channels across which the transmit and receive signals are carried, wherein the first and second echo cancellers and the transmit and receive channels have associated gain contributions, the speakerphone system further including a system controller for appropriately processing the associated gain contributions within the speakerphone system such that acoustic and electrical echo are minimized, the method comprising the steps of:

calculating a first half-loop gain comprising the gain contributions of the first echo canceller and the transmit and receive channels;

calculating a second half-loop gain comprising the gain contributions of the second echo canceller and the transmit and receive channels;

evaluating the first and second half-loop gains to determine if the transmit and receive signals should be attenuated; and adjusting the first and second half-loop gains to include the gain of at least one automatic gain controller (AGC).

2. The method of claim 1, wherein the speakerphone system includes a volume scaler having an associated variable gain, the method further comprising the step of adjusting the first half-loop gain to include the gain of the volume scaler.

3. The method of claim 2, wherein the step of calculating the first half-loop gain is performed according to the equation:

$$RXLOOP = \frac{1}{TXCHAN_{gain} * LEC_{gain} * RXCHAN_{gain} * VOL_{gain}},$$

where RXLOOP represents the first half-loop gain, and the associated gain contributions are representative of that from the transmit and receive channels (TXCHAN$_{gain}$ and RXCHAN$_{gain}$), the LEC (LEC$_{gain}$), and the volume scaler (VOL$_{gain}$).

4. The method of claim 1, wherein the at least one AGC comprises a transmit AGC and a receive AGC.

5. The method of claim 4, wherein the step of calculating the first half-loop gain is performed according to the equation:

$$RXLOOP = \frac{1}{TXAGC_{gain} * TXCHAN_{gain} * LEC_{gain} * RXAGC_{gain} * RXCHAN_{gain}},$$

where RXLOOP represents the first half-loop gain, and the associated gain contributions are representative of that from the transmit and receive channels (TXCHAN$_{gain}$ and RXCHAN$_{gain}$), the transmit AGC (TXAGC$_{gain}$), the LEC (LEC$_{gain}$), and the receive AGC (RXAGC$_{gain}$).

6. The method of claim 5, further wherein the step of calculating the second half-loop gain is performed according to the equation:

$$TXLOOP = \frac{1}{RXAGC_{gain} * RXCHAN_{gain} * AEC_{gain} *}{TXAGC_{gain} * TXCHAN_{gain}},$$

where TXLOOP represents the second half-loop gain, and the associated gain contribution from the AEC is the $AEC_{gain}$.

7. A method of adjusting and controlling transmit and receive signal amplitudes in a speakerphone system during speakerphone communication between a local user and a remote user the speakerphone system including a microphone and loudspeaker arrangement, first and second echo cancellers, and transmit and receive channels across which the transmit and receive signals are carried, wherein the first and second echo cancellers and the transmit and receive channels have associated gain contributions, the speakerphone system further including a system controller for appropriately processing the associated gain contributions within the speakerphone system such that acoustic and electrical echo are minimized, the method comprising the steps of:

calculating a first half-loop gain comprising the gain contributions of the first echo canceller and the transmit and receive channels;

calculating a second half-loop gain comprising the gain contributions of the second echo canceller and the transmit and receive channels;

evaluating the first and second half-loop gains to determine if the transmit and receive signals should be attenuated; and determining whether the speakerphone communication between the local and remote users is in a transmit mode, a silence mode, a double-talk mode, or a receive mode.

8. The method of claim 7, wherein the step of evaluating further includes balancing the transmit and receive channel gain contributions to accommodate the silence mode, comprising the steps of:

setting the receive channel gain to equal the first half-loop gain;

setting the transmit channel gain to equal the second half-loop gain; and smoothly switching the speakerphone communication to the silence mode.

9. The method of claim 7, wherein the step of evaluating further includes balancing the transmit and receive channel gain contributions to accommodate the double-talk mode, comprising the steps of:

multiplying the receive channel gain by the transmit channel gain to produce a resultant channel gain;

multiplying the first half-loop gain by the second half-loop gain to produce a resultant half-loop gain; and evaluating the resultant channel gain with the resultant half-loop gain, wherein if the resultant channel gain is less than the resultant half-loop gain, the following steps are performed:

comparing the receive channel gain to the transmit channel gain, wherein if the receive channel gain is greater than the transmit channel gain, the transmit channel gain is increased, and if the receive channel gain is less than the transmit channel gain, the receive channel gain is increased, and wherein if the resultant channel gain is greater than the resultant half-loop gain, the following steps are performed:

comparing the receive channel gain to the transmit channel gain, wherein if the receive channel gain is greater than the transmit channel gain, the receive channel gain is decreased, and if the receive channel gain is less than the transmit channel gain, the transmit channel gain is decreased.

10. The method of claim 7, wherein the step of evaluating further includes enhancing the transmit signal in the transmit mode, comprising the steps of:

multiplying the first half-loop gain by a predetermined scale factor;

setting the transmit channel gain at a target level;

incorporating the gain contribution associated with the second echo canceller over the receive signal; and smoothly switching the speakerphone communication to the transmit mode.

11. The method of claim 7, wherein the step of evaluating further includes enhancing the receive signal in the receive mode, comprising the steps of:

setting the receive channel at a target level;

multiplying the second half-loop gain by a predetermined scale factor;

incorporating the gain contribution from the first echo canceller over the transmit signal; and smoothly switching the speakerphone communication to the receive mode.

12. The method of claims 10 or 11, wherein the target level is 0 dB.

13. A method of adjusting and controlling transmit and receive signal amplitudes in a speakerphone system during speakerphone communication between a local user and a remote user, the speakerphone system including a microphone and loudspeaker arrangement, first and second echo cancellers, and transmit and receive channels across which the transmit and receive signals are carried, wherein the first and second echo cancellers and the transmit and receive channels have associated gain contributions, the speakerphone system further including a system controller for appropriately processing the associated gain contributions within the speakerphone system such that acoustic and electrical echo are minimized, the method comprising the steps of:

calculating a first half-loop gain comprising the gain contributions of the first echo canceller and the transmit and receive channels;

calculating a second half-loop gain comprising the gain contributions of the second echo canceller and the transmit and receive channels; and evaluating the first and second half-loop gains to determine if the transmit and receive signals should be attenuated, wherein the first and second echo cancellers comprise an acoustic echo canceller (AEC) and a line echo canceller (LEC), further wherein the step of calculating the first half-loop gain is performed according to the equation:

$$RXLOOP = \frac{1}{TXCHAN_{gain} * LEC_{gain} * RXCHAN_{gain}},$$

where RXLOOP represents the first half-loop gain, and the associated gain contributions are representative of that from the transmit and receive channels ($TXCHAN_{gain}$ and $RXCHAN_{gain}$) and the LEC ($LEC_{gain}$).

14. The method of claim 13, further wherein the step of calculating the second half-loop gain is performed according to the equation:

$$TXLOOP = \frac{1}{RXCHAN_{gain} * AEC_{gain} * TXCHAN_{gain}},$$

where TXLOOP represents the second half-loop gain and the associated gain contribution from the AEC is the $AEC_{gain}$.

15. A speakerphone system for enabling hands-free communication for a local user communicating with a remote user, the communication being defined as a mode among a plurality of communication modes, the speakerphone having a transmit channel and a receive channel, wherein the local user transmits transmit signals across the transmit channel and the remote user transmits receive signals across the receive channel, the transmit and receive channels having associated gain contributions, wherein the transmit and receive signals define an acoustic path, the speakerphone system comprising:

a microphone for transmitting the transmit signals to the remote user;

a loudspeaker disposed near the microphone for receiving the receive signals from the remote user and broadcasting the receive signals to the local user, wherein acoustic echo is generated between the microphone and loudspeaker;

an acoustic echo canceller (AEC) coupled to the microphone between the transmit channel and the receive channel, for generating a first impulse response representative of the acoustic path, wherein the AEC has an associated AEC gain;

a network interface coupled to the transmit and receive channels for connecting the speakerphone system to the remote user, the network interface for directing the transmit signals to the remote user and directing the receive signals across the receive channel to the local user, the network interface having an associated electrical echo;

a line echo canceller (LEC) coupled to the network interface between the receive and transmit channels for generating a second impulse response representative of the network interface;

a system controller for processing the transmit and receive signals being passed through the microphone to the network interface and from the network interface to the loudspeaker, the system controller including:

means for differentiating the first impulse response from the acoustic echo to provide a modified transmit signal, means for differentiating the second impulse response from the electric echo to provide a modified receive signal, means for identifying first and second gain half-loops in the speakerphone system, wherein the first half-loop includes associated gain contributions from the transmit channel ($TXCHAN_{gain}$), the LEC ($LEC_{gain}$), and the receive channel gain ($RXCHAN_{gain}$), and the second half-loop includes associated gain contributions from the AEC ($AEC_{gain}$), the receive channel gain ($RXCHAN_{gain}$), and the transmit channel gain ($TXCHAN_{gain}$), means for calculating a first half-loop gain according to the equation $$RXLOOP = \frac{1}{TXCHAN_{gain} * LEC_{gain} * RXCHAN_{gain}},$$

and means for calculating a second half-loop gain according to the equation $$TXLOOP = \frac{1}{RXCHAN_{gain} * AEC_{gain} * TXCHAN_{gain}};$$

and means for applying the first and second half-loop gains to the modified transmit and modified receive signals to control the gain and attenuation of the modified transmit and modified receive signals such that any residual echo retransmitted to the remote user is less than the receive signals.

16. The speakerphone system of claim 15, further comprising a transmit speech detector for receiving the transmit signals and a receive speech detector for receiving the receive signals, the transmit and receive speech detectors for determining the communication mode in which the local and remote users are communicating.

17. The speakerphone system of claim 15, wherein each half-loop gain is less than one.

18. The speakerphone system of claim 15, wherein the remote user is transmitting receive signals to the local user via a remote speakerphone.

19. The speakerphone system of claim 15, further comprising:

a transmit automatic gain controller (AGC) coupled to the microphone for receiving the transmit signals and the first impulse response signals generated by the AEC, and for providing a gain to the transmit signals, the transmit AGC having an associated transmit AGC gain; and a receive AGC coupled to the loudspeaker on the receive channel for receiving the receive signals and the second impulse response signals generated by the LEC, and for providing a gain to the receive signals, the receive AGC having an associated receive AGC gain, wherein the means for calculating a first half-loop gain is according to the equation:

$$RXLOOP = \frac{1}{TXAGC_{gain} * TXCHAN_{gain} * LEC_{gain} * RXAGC_{gain} * RXCHAN_{gain}},$$

and the means for calculating a second half-loop gain is according to the equation:

$$TXLOOP = \frac{1}{RXAGC_{gain} * RXCHAN_{gain} * AEC_{gain} * TXAGC_{gain} * TXCHAN_{gain}},$$

where the gain contributions from the transmit and receive AGCs are called $TXAGC_{gain}$ and $RXAGC_{gain}$.

20. The speakerphone system of claim 19, further comprising a volume controller having a variable gain ($VOL_{gain}$) for controlling the amplitude of the receive signals before being broadcast by the loudspeaker.

21. The speakerphone system of claim 20, wherein the first half-loop gain is calculated according to the equation:

$$RXLOOP = \frac{1}{TXAGC_{gain} * TXCHAN_{gain} * LEC_{gain} * RXAGC_{gain} * RXCHAN_{gain} * VOL_{gain}}.$$

22. The speakerphone system of claim 15, wherein the plurality of communication modes includes a transmit mode, silence mode, double-talk mode, and receive mode.

23. The speakerphone system of claim 22, wherein if the communication mode is the receive mode, and if first half-loop gain is substantially low, the transmit signal is not attenuated.

24. The speakerphone system of claim 22, wherein if the communication mode is the transmit mode, and if the second half-loop gain is substantially low, the receive signal is not attenuated.

* * * * *